(12) United States Patent
Simerson et al.

(10) Patent No.: US 11,228,581 B2
(45) Date of Patent: Jan. 18, 2022

(54) SECURE DELAYED FIDO AUTHENTICATION

(71) Applicant: Motorola Mobility LLC, Chicago, IL (US)

(72) Inventors: Jarrett Simerson, Glenview, IL (US); Rachid Alameh, Crystal Lake, IL (US); Joel Voss, Elkhorn, WI (US)

(73) Assignee: Motorola Mobility LLC, Chicago, IL (US)

( * ) Notice: Subject to any disclaimer, the term of this patent is extended or adjusted under 35 U.S.C. 154(b) by 323 days.

(21) Appl. No.: 16/295,912

(22) Filed: Mar. 7, 2019

(65) Prior Publication Data

US 2020/0287889 A1    Sep. 10, 2020

(51) Int. Cl.
*H04L 29/06* (2006.01)

(52) U.S. Cl.
CPC ...... *H04L 63/0823* (2013.01); *H04L 63/0861* (2013.01); *H04L 63/0892* (2013.01); *H04L 63/102* (2013.01); *H04L 63/1408* (2013.01)

(58) Field of Classification Search
CPC ............. H04L 63/0823; H04L 63/0861; H04L 63/0892; H04L 63/102; H04L 63/1408; H04W 12/065
See application file for complete search history.

(56) References Cited

U.S. PATENT DOCUMENTS

| | | | | |
|---|---|---|---|---|
| 9,560,143 B2* | 1/2017 | Gwin | ................. | H04W 12/065 |
| 9,876,788 B1* | 1/2018 | Ziraknejad | .............. | G06F 21/34 |
| 10,231,128 B1* | 3/2019 | Ziraknejad | .......... | H04L 63/0428 |
| 10,841,316 B2* | 11/2020 | Innes | ..................... | H04L 63/101 |
| 2003/0159044 A1* | 8/2003 | Doyle | .................. | G07F 7/1008 |
| | | | | 713/176 |
| 2011/0078773 A1* | 3/2011 | Bhasin | ................ | H04W 12/068 |
| | | | | 726/5 |
| 2013/0061303 A1* | 3/2013 | Hart | ........................ | G06F 21/72 |
| | | | | 726/6 |
| 2013/0081118 A1* | 3/2013 | Ge | ....................... | H04L 63/0815 |
| | | | | 726/6 |
| 2015/0180869 A1* | 6/2015 | Verma | ................. | H04L 63/0884 |
| | | | | 726/4 |
| 2015/0350182 A1* | 12/2015 | Pyle | ........................ | H04L 69/40 |
| | | | | 726/7 |
| 2017/0091439 A1* | 3/2017 | Sharma | ................ | H04W 12/068 |
| 2018/0115546 A1* | 4/2018 | Ito | ........................... | H04L 63/06 |
| 2019/0075102 A1* | 3/2019 | Kim | ...................... | H04L 9/3239 |
| 2019/0124081 A1* | 4/2019 | Nowak | ............... | H04L 63/0892 |
| 2019/0149542 A1* | 5/2019 | Scopis | .................... | G06F 21/32 |
| | | | | 726/7 |

(Continued)

*Primary Examiner* — Sarah Su

(57) ABSTRACT

Systems and methods for authenticating a user of a mobile electronic device to use a FIDO (fast identification online) compliant application in the device are provided. These entail receiving a user authentication input at the mobile electronic device and caching the authentication input. While the authentication input remains cached, the user is authenticated to use the mobile electronic device via the authentication input. The mobile electronic device is then unlocked and the FIDO compliant application is opened. Secure delayed FIDO authentication is then executed by providing the cached authentication input to the FIDO compliant application to open an authenticated session of the user on the FIDO compliant application.

20 Claims, 4 Drawing Sheets

(56) References Cited

U.S. PATENT DOCUMENTS

| | | | |
|---|---|---|---|
| 2019/0182237 A1* | 6/2019 | Queralt | H04L 9/3263 |
| 2019/0222424 A1* | 7/2019 | Lindemann | H04L 9/0861 |
| 2019/0251561 A1* | 8/2019 | Oosthuizen | G06Q 20/4014 |
| 2019/0295203 A1* | 9/2019 | Cho | G06Q 20/32 |
| 2019/0333054 A1* | 10/2019 | Cona | G06F 21/31 |
| 2020/0145219 A1* | 5/2020 | Sebastian | H04L 9/3236 |
| 2020/0275274 A1* | 8/2020 | Kwon | H04W 12/47 |
| 2020/0287909 A1* | 9/2020 | Robinson | H04L 63/105 |
| 2020/0374284 A1* | 11/2020 | Suresh | H04W 12/06 |

* cited by examiner

SECURE DELAYED FIDO AUTHENTICATION

TECHNICAL FIELD

The present disclosure is related generally to mobile electronic communications devices and, more particularly, to systems and methods for facilitating FIDO (Fast Identity Online) authentication with enhanced user detection and tracking for security.

BACKGROUND

As consumers have begun to handle high-security tasks such as banking transactions via their mobile devices, it has become more difficult for banks and other secured facilities to ensure uniform compliance and device interoperability. FIDO is a recent attempt to alleviate the problems associated with the lack of interoperability among strong authentication devices.

FIDO supports a range of authentication technologies, including biometrics such as fingerprint and iris scanners, voice and facial recognition, and other existing solutions and standards, such as Trusted Platform Modules (TPM), USB security tokens, embedded Secure Elements (eSE), smart cards, and near field communication (NFC). FIDO has had significant success with respect to many of its goals, but still presents an additional user step that can cause delay and lost efficiency for users.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objectives and advantages, may be best understood from the following detailed description taken in conjunction with the accompanying drawings of which:

DETAILED DESCRIPTION

Before discussing embodiments of the disclosed principles in full detail, an overview of certain embodiments is given to aid the reader in understanding the later more detailed discussion. As noted above, FIDO has had significant success with respect to many of its goals, but still presents an additional user step that can cause delay and lost efficiency for users.

However, in an embodiment of the disclosed principles, an architecture is provided which facilitates always-on FIDO level authentication via user authentication on a device. This enables a user to authenticate to their device and also seamlessly open a FIDO secured application ("app") using cached authentication input. This is referred to herein as "secure delayed FIDO authentication." The process remains secure by monitoring user continuity and may also time out if excess delay is encountered.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Figure 1:
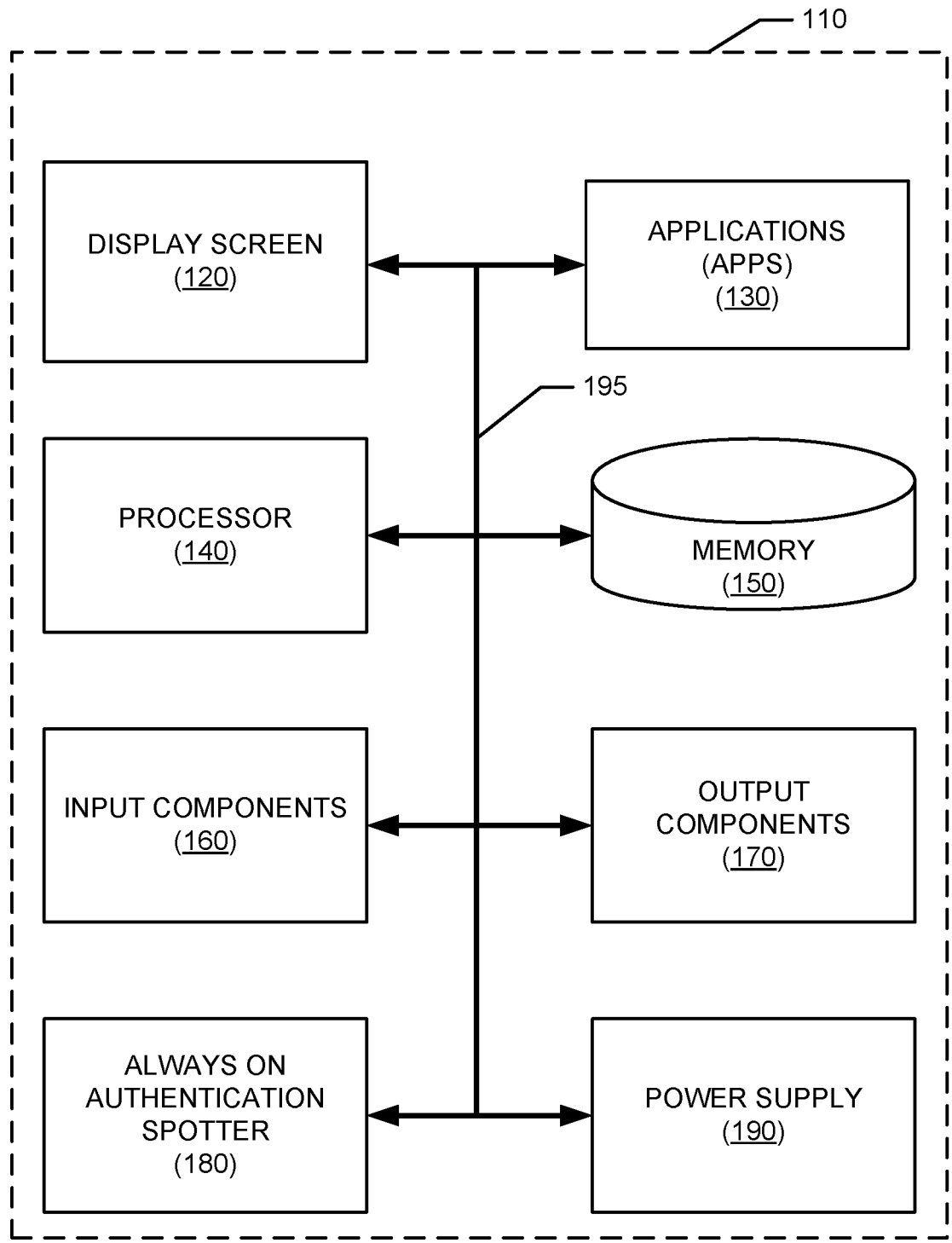
FIG. 1 is a schematic representation of a mobile electronic device in which various embodiments of the disclosed principles may be implemented.

Thus, for example, while FIG. 1 illustrates an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example, one or more antennas and associated circuitry and logic. The antennas and associated circuitry may support any number of protocols, e.g., WiFi, Bluetooth, cellular, etc.

The device 110 as illustrated also includes one or more output components 170 such as RF (radio frequency) or wired output facilities. The RF output facilities may similarly support any number of protocols, e.g., WiFi, Bluetooth, cellular, etc., and may be the same as or overlapping with the associated input facilities. It will be appreciated that a single physical input may serve for both transmission and receipt.

The processor 140 can be a microprocessor, microcomputer, application-specific integrated circuit, or other suitable integrated circuit. For example, the processor 140 can be implemented via one or more microprocessors or controllers from any desired family or manufacturer. Similarly, the memory 150 is a nontransitory media that may (but need not) reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code (e.g., applications 130) associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to the described embodiments.

In an embodiment, an always on authentication spotter 180 reads a thermal sensor on the surface of the device, as well as any secondary sensor, to provide touch detection to detect a user's finger near or on a lens of the thermal sensor. The thermal sensor and secondary sensor may be located anywhere on the outside of the device, e.g., in a location where a user's hand is expected to touch when the device is held.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a power supply 190, such as a battery or fuel cell, is included for providing power to the device 110 and its components. Additionally or alternatively, the device 110 may be externally powered, e.g., by a vehicle battery, wall socket or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120.

Figure 2:
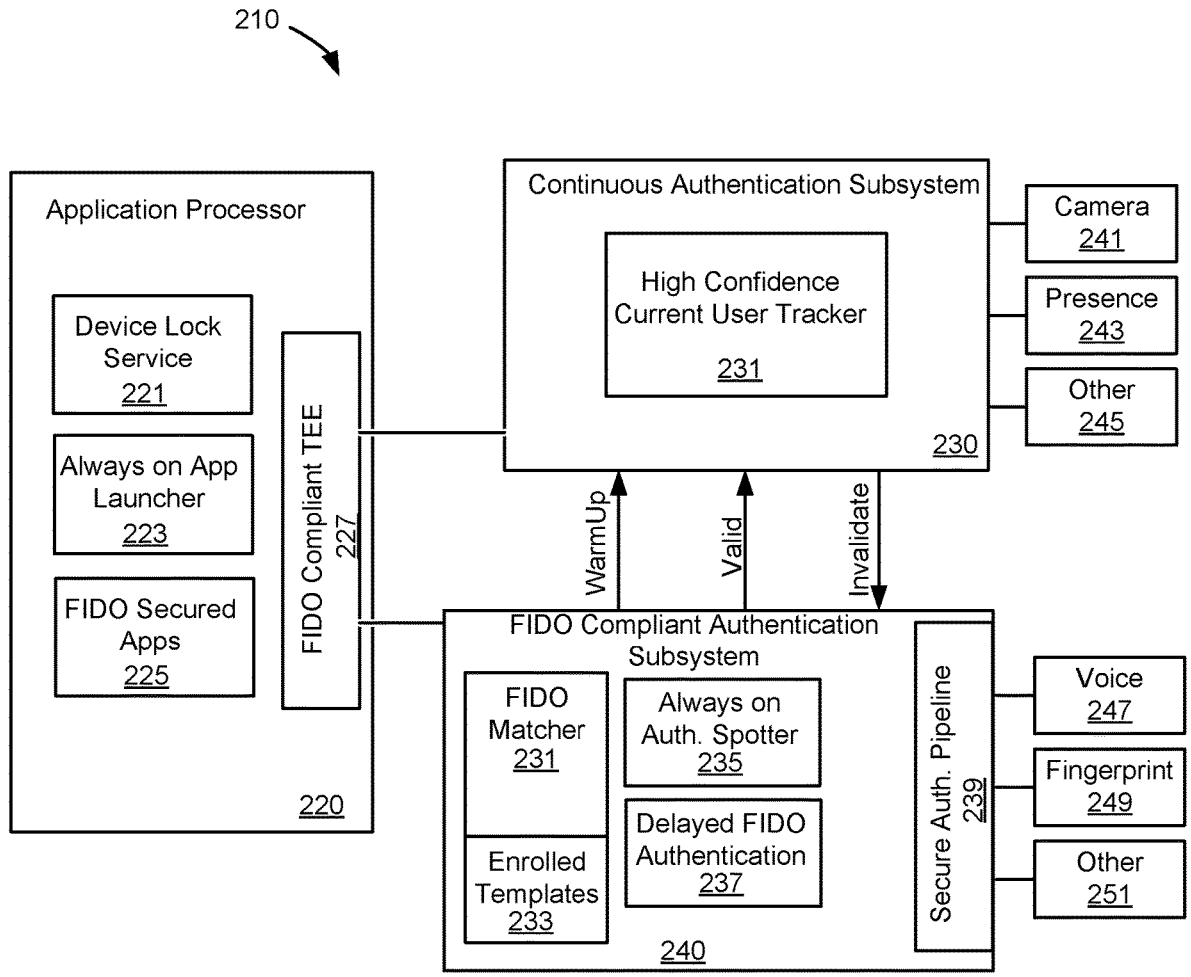
FIG. 2 is a schematic diagram showing the primary components of an example computing environment within which various embodiments of the disclosed principles may be implemented.

FIG. 2 is a schematic diagram showing the primary components of an example computing environment within which various embodiments of the disclosed principles may be implemented. The illustrated environment 201 is implemented within a computing device such as the user device of FIG. 1 or otherwise.

The illustrated environment 210 includes an application processor 220, a continuous authentication subsystem 230 and a FIDO compliant authentication subsystem 240. The application processor 220 further comprises a device lock service 221, an always-on application launcher 223 and FIDO secured applications 225.

The continuous authentication subsystem 230 further includes a high confidence current user tracker 231. The continuous authentication subsystem 230 reads a number of data sources, e.g., a camera 241, which may be the device camera/IR camera/depth sensor array, a presence sensor 243 such as a device thermopile or IR proximity sensor, or ultrasound, motion enabled via accelerometer/gyro, capacitive touch, wearable sensor detection, and optionally other sensors 245 capable of providing data indicative of a user presence (beacons, RF communication, BT, etc.).

Referring to the FIDO compliant authentication subsystem 240, this element further includes a FIDO matcher 231 and associated enrollment templates 233 as well as an always on authentication spotter 235 (see also element 180, FIG. 1) and a delayed FIDO authentication module 237. The FIDO compliant authentication subsystem 240 receives input via a secure authentication pipeline 239 from a number of authentication data sources. In the illustrated embodiment these include a voice data source 247 and a fingerprint data source 249, as well as any other desired authentication data source or sources 251.

Figure 3:
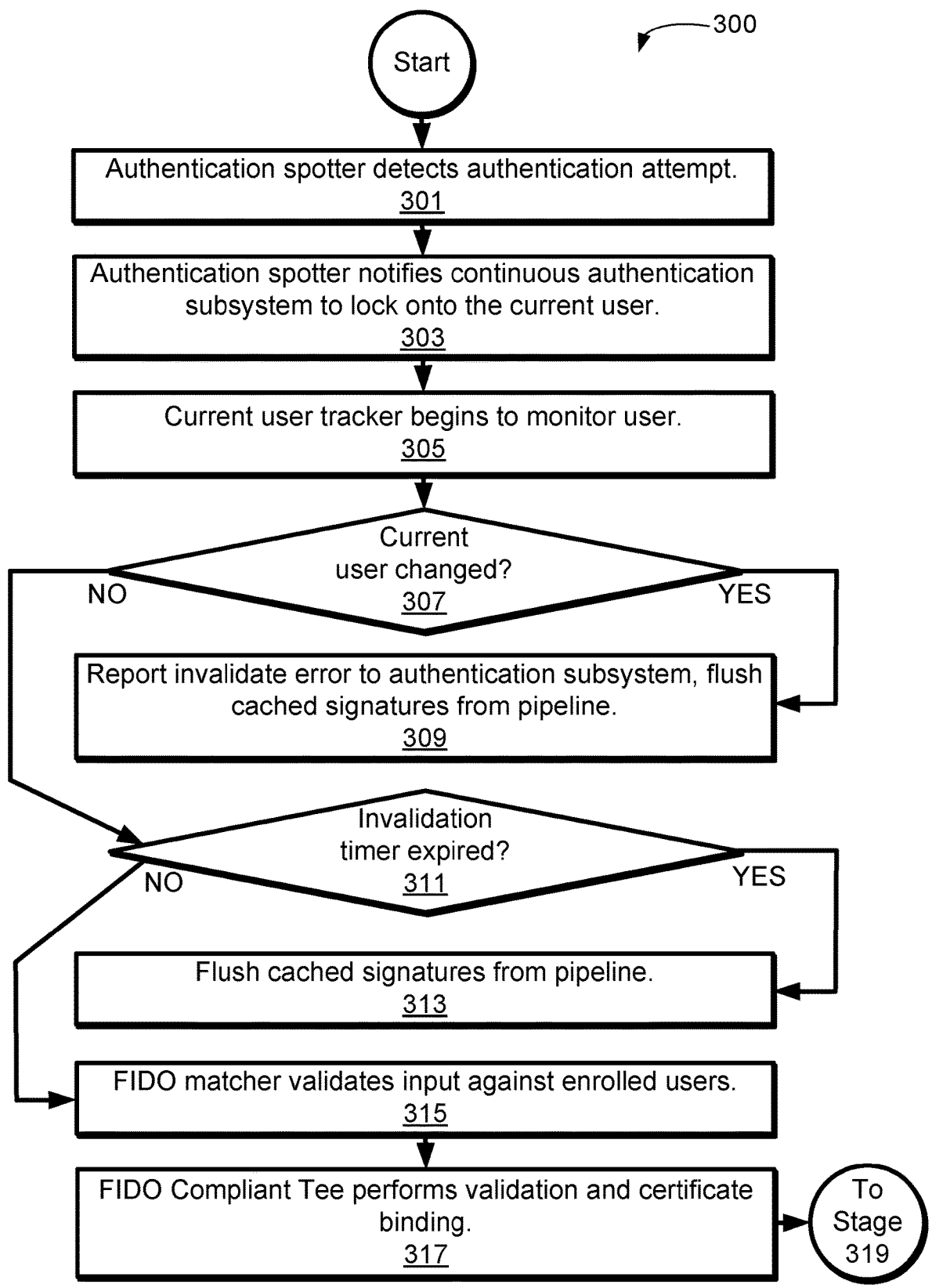
FIG. 3 is a flowchart showing an example process for implementing certain of the described principles within an environment similar to that shown in FIG. 2.

FIG. 3 is a flowchart showing an example process 300 for implementing the described principles, with reference to the example architecture of FIG. 2. At stage 301 of the process 300, the always on authentication spotter 235 detects the start of an authentication attempt. In an embodiment, the always on authentication spotter 235 selects the most viable of multiple possible authentication inputs, e.g., based on user-to-device distance. For example, if a user is too distant for image-based authentication to be viable, an audio authentication attempt may be valid and may thus be matched first (e.g., the depth sensor can be used to determine distance and thus to determine which sensor to start with for authentication). For a closer user, image-based and audio authentication may be viable. If the device is in the user's hand, then fingerprint scan (FPS), PIN entry, facial recognition, and voice authentication may all be viable. The authentication spotter 235 may then use authentication methods in a predetermined order or may use the first that becomes viable.

At stage 303, the authentication spotter 235 notifies the continuous authentication subsystem 230 to begin to lock onto the current user of the device. Locking on may entail monitoring user credentials or otherwise determining that the authenticated user is the current user. The current user tracker 231 then begins at stage 305 to monitor the user for user ID purposes.

This is because it is possible for the authenticated user to leave the device momentarily, in which case an unauthenticated person may attempt to interact with the device. At stage 307, the current user tracker 231 determines whether the current user has changed during the authentication session. A change in current user may be triggered by one or more others being detected by the device (e.g., the session is no longer private, or the authenticated user is no longer interacting with the device). In an embodiment, if authentication happens during device carry, then tracking is omitted until the device is placed down.

If the current user has changed, an invalidate error is reported to the FIDO compliant authentication subsystem in stage 309 and any cached authentication signatures are flushed from the pipeline. Otherwise the process flows to stage 311. An invalidation timer is also running within the FIDO compliant authentication subsystem 240 during the authenticated session. As such, the invalidation timer is checked at stage 311, and if it has expired, any cached authentication signatures are flushed from the pipeline at stage 313.

If the invalidation timer has not expired, then at stage 315 the FIDO matcher 231 validates the input against the enrolled user (e.g., matching voice, facial scan and/or FPS data in enrolled templates 233) and may select which to try to match first based on presence indication or the other factors discussed above. If an attempt to validate using one input fails, the FIDO matcher 231 will then try one or more of the other authentication inputs.

Figure 4:
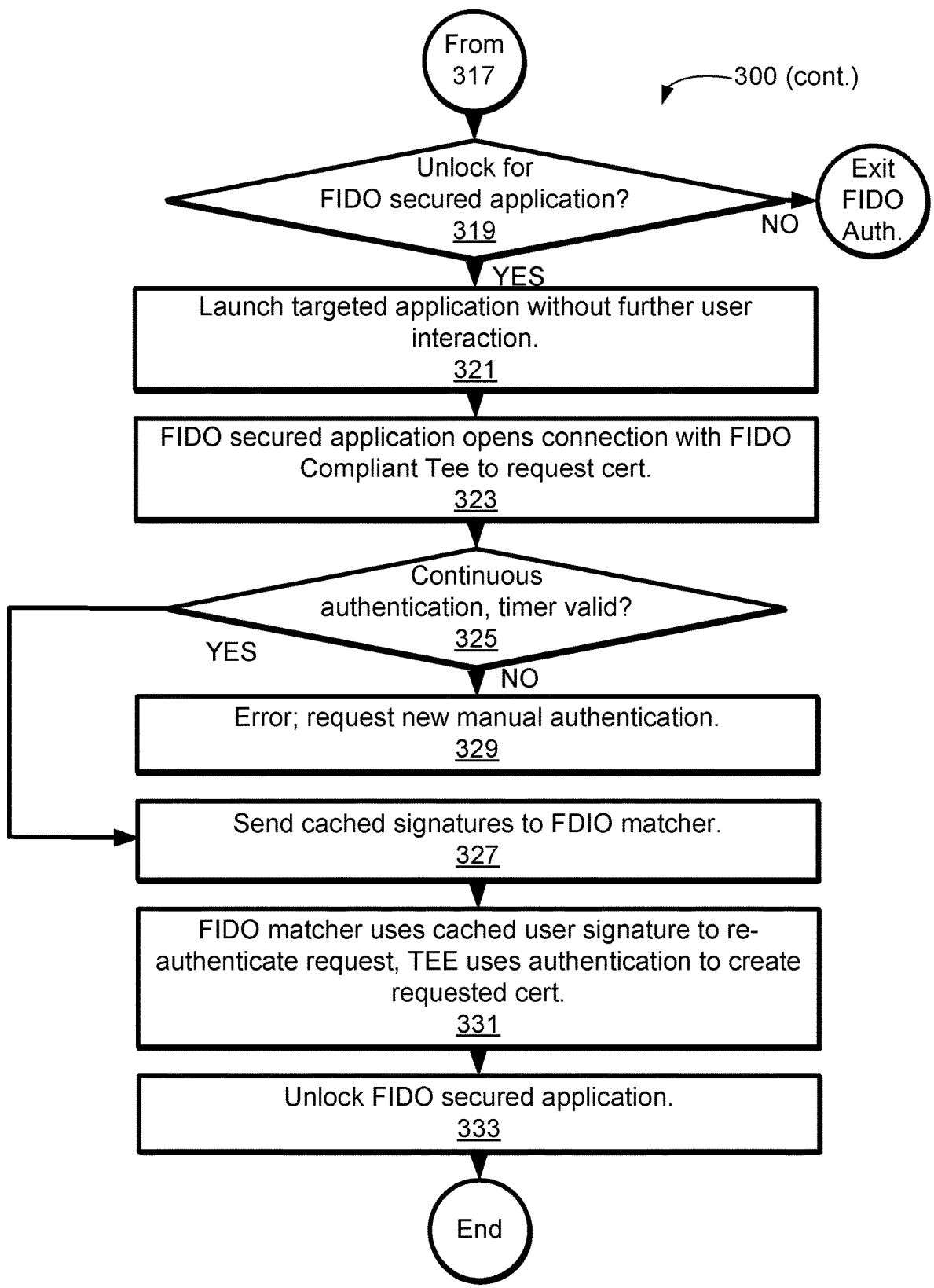
FIG. 4 is a flowchart continuing the flowchart of FIG. 3.

At stage 317, the FIDO Compliant Tee 227 of the application processor 220 performs validation and certificate binding to unlock the device 110. The flowchart of FIG. 3 continues in FIG. 4. At stage 319, the always-on app launcher 223 of the application processor 220 determines if the unlock was to use a FIDO secured application 225, e.g., a FIDO compliant banking application. If it is determined that the unlock was to use a FIDO secured application 225, the targeted application is launched at stage 321 without further user interaction.

Whether or not the unlock was to use a FIDO secured application 225 may be determined from the authentication input itself in an embodiment. For example, a voice authentication input may state that the user desires to check their bank balance, in which case the targeted application would be the secure banking application on the device 110.

The now-open FIDO secured application 225 opens a connection at stage 323 with the FIDO Compliant Tee 227 to request a cert to use between the application 225 and its associated cloud services. The FIDO Compliant Tee 227 opens a connection to the FIDO compliant authentication subsystem 240 at stage 323 to request authentication.

At stage 325, the delayed FIDO authentication system 237 verifies that the continuous authentication has been maintained (e.g., the device never left the control of the user following authentication because it never left the user hand after authentication or user is still authenticated via voice), and the timer is still valid for the cached signatures. If these criteria are met, the cached signatures are sent to the FDIO matcher 231 at stage 327. Otherwise, an error is returned to request a new manual authentication at stage 329.

From stage 327, the process 300 moves to stage 331, wherein the FIDO matcher 231 uses the cached user signature to re-authenticate the request and the TEE uses the authentication to create the requested cert. At stage 333, the FIDO secured application is unlocked.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of authenticating a user of a mobile electronic device to use a FIDO (fast identification online) compliant application in the mobile electronic device, the method comprising:

receiving a user authentication input at the mobile electronic device;

caching the user authentication input as cached user authentication input and, while the user authentication input remains cached, authenticating the user to use the mobile electronic device via the user authentication input;

unlocking the mobile electronic device;

opening the FIDO compliant application; and executing secure delayed FIDO authentication by providing the cached user authentication input to the FIDO compliant application to open an authenticated session of the user on the FIDO compliant application;

wherein:

the opening of the FIDO compliant application occurs on the mobile electronic device; and the executing the secure delayed FIDO authentication by providing the cached user authentication input to the FIDO compliant application to open the authenticated session of the user on the FIDO compliant application occurs without requiring additional authentication input.

2. The method in accordance with claim 1, wherein the user authentication input identifies the FIDO compliant application.

3. The method in accordance with claim 1, further comprising monitoring the user during the authenticated session to detect if a user monitored since the user authentication input was received changes.

4. The method in accordance with claim 3, wherein monitoring the user during the authenticated session to detect if the user changes further comprises periodically detecting a user feature and comparing the user feature to one or more stored user features.

5. The method in accordance with claim 3, wherein monitoring the user during the authenticated session to detect if a user monitored since the user delivered the user authentication input changes further comprises detecting that the mobile electronic device is not in a hand of the user delivering the user authentication input, and in response, detecting a user feature and comparing the user feature to one or more stored user features.

6. The method in accordance with claim 3, further comprising flushing cached authentication input from a secure authentication pipeline delivering input to a FIDO compliant authentication subsystem comprising a FIDO matcher, an always on authentication spotter, and a delayed FIDO authentication module if the user changes during the authenticated session.

7. The method in accordance with claim 1, further comprising monitoring a timer for expiration, and flushing cached authentication signatures from a secure authentication pipeline delivering input to a FIDO compliant authentication subsystem and ending the authenticated session if the timer expires.

8. A mobile electronic device that authenticates a user for a FIDO (fast identification online) compliant application, the mobile electronic device comprising:

a user authentication input device configured to receive information from a user;

a user interface configured to convey information to the user; and a processor configured to receive a user authentication input at the mobile electronic device via the user authentication input device, cache the user authentication input as cached user authentication input and, while the user authentication input remains cached, authenticate the user to use the mobile electronic device via the user authentication input, open the FIDO compliant application, and provide the cached user authentication input to the FIDO compliant application to open an authenticated session of the user on the FIDO compliant application;

wherein the user authentication input device is selected based upon a distance between the user and the mobile electronic device, with additional user authentication input devices being required to capture the user authentication input as the user gets closer to the mobile electronic device.

9. The mobile electronic device in accordance with claim 8, wherein the processor is further configured to monitor the user during the authenticated session to detect if the user changes while being monitored during the authenticated session.

10. The mobile electronic device in accordance with claim 9, wherein the processor is further configured to monitor the user during the authenticated session by periodically detecting a user feature and comparing the user feature to one or more stored user features.

11. The mobile electronic device in accordance with claim 9, wherein the processor is further configured to monitor the user during the authenticated session by detecting that the mobile electronic device is being carried by a user delivering the user authentication input, and in response, omitting monitoring the user until the mobile electronic device is placed down.

12. The mobile electronic device in accordance with claim 9, wherein the processor is further configured to flush cached authentication input if the authenticated session is no longer private.

13. The mobile electronic device in accordance with claim 8, wherein the mobile electronic device comprises:
a continuous authentication subsystem comprising a user tracker;
a FIDO compliant authentication system, operable with the continuous authentication subsystem and comprising a FIDO matcher, an always on authentication spotter, and a delayed FIDO authentication module, and a secure authentication pipeline for receiving FIDO compliant authentication system input; and
an application processor, operable with the continuous authentication subsystem and the FIDO compliant authentication system and comprising an always on application launcher and a FIDO compliant TEE performing validation and certificate binding to unlock the mobile electronic device.

14. The mobile electronic device in accordance with claim 13, wherein the always on authentication spotter causes the continuous authentication subsystem to lock onto the user.

15. The mobile electronic device in accordance with claim 8, wherein the user authentication input device receiving the user authentication input comprises a plurality of user authentication input devices receiving a plurality of user authentication inputs when the mobile electronic device is in a hand of the user.

16. The mobile electronic device in accordance with claim 8, further comprising a FIDO compliant tee launching the FIDO compliant application upon verifying that continuous authentication with the user has been maintained since the processor authenticated the user to use the mobile electronic device without further user interaction.

17. A mobile electronic device that authenticates a user for a FIDO (fast identification online) compliant application, the mobile electronic device comprising:
a user authentication input device configured to receive information from a user;
a user interface configured to convey information to the user; and
a processor configured to receive a user authentication input at the mobile electronic device via the user authentication input device, cache the user authentication input as cached user authentication input and, while the user authentication input remains cached, authenticate the user to use the mobile electronic device via the user authentication input, open the FIDO compliant application, and provide the cached user authentication input to the FIDO compliant application to open an authenticated session of the user on the FIDO compliant application;
further comprising a FIDO compliant tee launching the FIDO compliant application upon verifying that continuous authentication with the user has been maintained since the processor authenticated the user to use the mobile electronic device without further user interaction.

18. The mobile electronic device in accordance with claim 17, wherein the processor is further configured to flush cached authentication input if the authenticated session is no longer private.

19. The mobile electronic device in accordance with claim 17, wherein the processor is further configured to monitor the user during the authenticated session to detect if the user changes while being monitored during the authenticated session.

20. The mobile electronic device in accordance with claim 19, wherein the processor is further configured to monitor the user during the authenticated session by periodically detecting a user feature and comparing the user feature to one or more stored user features.

* * * * *